(12) United States Patent
McDowell

(10) Patent No.: US 7,726,130 B2
(45) Date of Patent: Jun. 1, 2010

(54) STIRLING-ELECTRIC HYBRID AUTOMOBILE

(75) Inventor: Joseph Shea McDowell, 5504 Legacy Oaks Pkwy #1435, San Antonio, TX (US) 78154

(73) Assignee: Joseph Shea McDowell, San Antonio, TX (US)

( * ) Notice: Subject to any disclaimer, the term of this patent is extended or adjusted under 35 U.S.C. 154(b) by 246 days.

(21) Appl. No.: 12/119,459

(22) Filed: May 12, 2008

(65) Prior Publication Data

US 2008/0276610 A1    Nov. 13, 2008

Related U.S. Application Data

(60) Provisional application No. 60/917,608, filed on May 11, 2007.

(51) Int. Cl.
*F01B 21/04* (2006.01)
(52) U.S. Cl. .................................. 60/716; 60/719
(58) Field of Classification Search ............ 60/716, 60/718, 719, 517; 180/65.26, 65.28, 65.285
See application file for complete search history.

(56) References Cited

U.S. PATENT DOCUMENTS

| | | | | |
|---|---|---|---|---|
| 4,021,677 A | * | 5/1977 | Rosen et al. | 290/40 R |
| 4,313,080 A | * | 1/1982 | Park | 320/123 |
| 4,382,484 A | * | 5/1983 | Anderson et al. | 180/165 |
| 7,238,139 B2 | * | 7/2007 | Roethler et al. | 475/216 |

* cited by examiner

*Primary Examiner*—Hoang M Nguyen

(57) ABSTRACT

The Stirling-Electric Hybrid automobile herein disclosed utilizes an electric drive motor which is powered by electric storage device. The electric storage device is kept at suitable charge by electric generator mechanically driven by external combustion of Stirling engine type, by thermoelectric generator thermally coupled to the exhaust of the Stirling engine and to kinetic energy recovery system which during deceleration of the automobile utilizes the electric drive motor as a generator and recovering the electrical energy generated by deceleration to the electric storage device. Almost any clean combusting liquid or gaseous fuel may be utilized by the Stirling engine with greater fuel economy and less atmospheric pollution than internal combustion engines presently used. The utilization of thermoelectric generator to recover heat from exhaust of the Stirling engine and utilization of kinetic energy recovery system provides even better fuel efficiency and reduced pollution.

1 Claim, 1 Drawing Sheet

STIRLING-ELECTRIC HYBRID AUTOMOBILE

CROSS REFERENCE TO RELATED APPLICATIONS

This application relates back and claims priority to U.S. Provisional Patent Application 60/917,608 filed May 11, 2007.

BACKGROUND OF THE INVENTION

1. Field of the Invention

The present invention relates generally to field of self-propelled, land vehicles primarily used for transportation of people and cargo on improved road surfaces (commonly referred to as the automotive field, but including trucks, buses and specialty vehicles). More particularly the present invention relates to what are frequently called hybrid vehicles, namely those which use two or more distinct power sources to propel the vehicle. As one of the power sources of the vehicle of the invention is electric it relates to the field of hybrid-electric vehicles. As one of the power sources of the invention is a Stirling Cycle Engine, which said engine may be operated on a wide variety of liquid fuels the invention also relates to the field of flexible fuel hybrid-electric vehicles. As the invention also includes a Thermoelectric Generator and Regenerative Braking it also relates to those field.

2. Description of Related Art

Early in the field of automotive design engines which run on the Stirling Cycle (hereinafter called "Stirling Engines") were tried and did demonstrate some utility. However use of such engines for automobiles was subsequently abandoned in favor of internal combustion engines, despite the fact that Stirling Engines pose the potential for the greatest fuel efficiency of any of the real heat engine designs, have few noxious emissions and can be run on a variety of fuels. It appears that this abandonment resulted from the fact that Stirling Engines could not generate useful amounts of power immediately after cold start (but must be heated to operating temperature, in contrast with internal combustion engines which can generally be used immediately after starting) and the fact that Stirling Engines are not very responsive to varying power demands (accelerate and decelerate at significantly slower rate than internal combustion engines).

While significantly more "responsive" than Stirling Engines, internal combustion engines possess certain undesirable characteristics, including considerably worse fuel economy, greater emission of noxious exhaust gases (including oxides of nitrogen and carbon) and each are designed to operate on a very narrow range of fuel. As long as all forms of fuel for internal combustion engines was cheap and plentiful, and the consequences of noxious exhaust gases was not well appreciated, the use of the internal combustion engine was the preferred automotive engine. Now that fuel is becoming increasingly scarce and very expensive and the consequences of atmospheric pollution becoming increasingly appreciated, decreased use of the internal combustion engine would appear to be highly desirable. Yet the undesirable characteristics of using a Stirling Engine to drive automobiles remained to be over-come. The invention described and claimed herein employs use of a Stirling Engine in the automobile but uses it in a way that over-comes the undesirable characteristics of the Stirling Engine previously encountered in such use.

Similarly there has been some, but not widespread, use of electric motors to drive automobiles. In general electric drive motors have been used in "all electric" cars and in "hybrid-electric" vehicles that employ the internal combustion engine either to drive the driven wheels of the vehicle, to charge the battery of the vehicle or some combination of both.

"All electric" vehicles, which are driven by electric motor which draws electricity from a non-board battery suffer certain disadvantages which limit their utility. Principally these limitations relate to the limited range that may be obtained from on-board battery which is of reasonable size, weight and expense, coupled with the long time required to recharge an exhausted battery (or the impracticalities involved in changing replacing exhausted battery with a charged battery).

"Hybrid-electric" vehicles which employ the use of an electric motor to drive the vehicle and an internal combustion engines (to charge the battery of the vehicle or when extra power is needed) have had some success, mainly derived from their use of a smaller internal combustion engine, shutting same down when the vehicle is at idle and use the use of regenerative braking (whereby upon braking the automobile is used as a generator to charge the battery of the vehicle), but suffer at least some degree of the disadvantages of internal combustion engines mentioned above (poor fuel efficiency, higher undesirable emissions and largely inflexible fuel requirements).

In the last two decades there appears to have some experimentation with development of a hybrid-electric vehicle that employs use of a Stirling Engine to generate electricity which charges the battery of the vehicle, delivers electric power to the automobile of the vehicle but it appears that such experimentation was unsuccessful because of a variety of problems including lower-than-expected thermal efficiency, high heat rejection requirements, poor specific power, and excessive hydrogen leakage.

At the same time improvements in thermoelectric generating devices have improved the cost, efficiency and size of such devices, making it possible that waste heat can now be practically employed to generate useful quantities of electrical power.

It does not appear that all of the advances in technology which have recently taken place, including reducing the size, weight and electrical storage capacity of batteries; improvements in the design of automobiles, including reduction of their size, weight and efficiency; improvements in solid state switching of heavy electrical currents; improvement in Stirling Engines; use regenerative braking technology; and, improvements in thermoelectric generators have been brought together to create a hybrid-electric automobile drive system which is operable on a wide variety of liquid fuels, provides for substantial increases in fuel economy and is less polluting of the atmosphere.

OBJECTS OF THE INVENTION

The principal object of the invention is to provide a highway-capable automobile with better fuel economy than automobiles using conventional internal combustion engines. Another object of the invention is to provide a highway-capable automobile which is capable of being operated from a wide variety of liquid or gaseous fuels including but not limited to gasoline, kerosene and diesel fuels, liquid fuels derived from coal, alcohols, methane, butane and propane and other clean-burning liquid or gaseous fuels. Yet another object of the invention is to provide an automobile which emits fewer harmful emissions than automobiles utilizing conventional internal combustion engines.

Other objects of the invention relate to overcoming certain disadvantages which exist concerning use of Stirling engines to drive an automobile, including but not necessarily limited to relatively lengthy time necessary for a Stirling engine to heat to operating temperature, relatively slow responsiveness to varying (increased or decreased) power demand.

SUMMARY OF THE INVENTION

The objects of the invention are accomplished by providing an automobile with desired power to drive the automobile. The automobile is driven by electric storage device, such as battery and/or capacitors, which is charged, as necessary, by electric generator driven by relatively small (compared to accelerative potential of the automobile) external combustion Stirling engine. Efficiency of the Stirling engine is enhanced by employing the heat of the exhaust of the Stirling engine to drive an array Seebeck thermoelectric generators, the electrical output of which is also directed to the electric storage device or devices of the automobile. Efficiency of the automobile is further enhanced by utilizing the electric (drive) motor of the automobile as a generator (the electric output of which is also directed to the electric storage device or devices of the automobile) during braking of the automobile. Means may also be provided to charge the electric storage device or devices of the automobile from external sources of electrical power as may be available.

PREFERRED EMBODIMENT OF THE INVENTION

Figure 1:
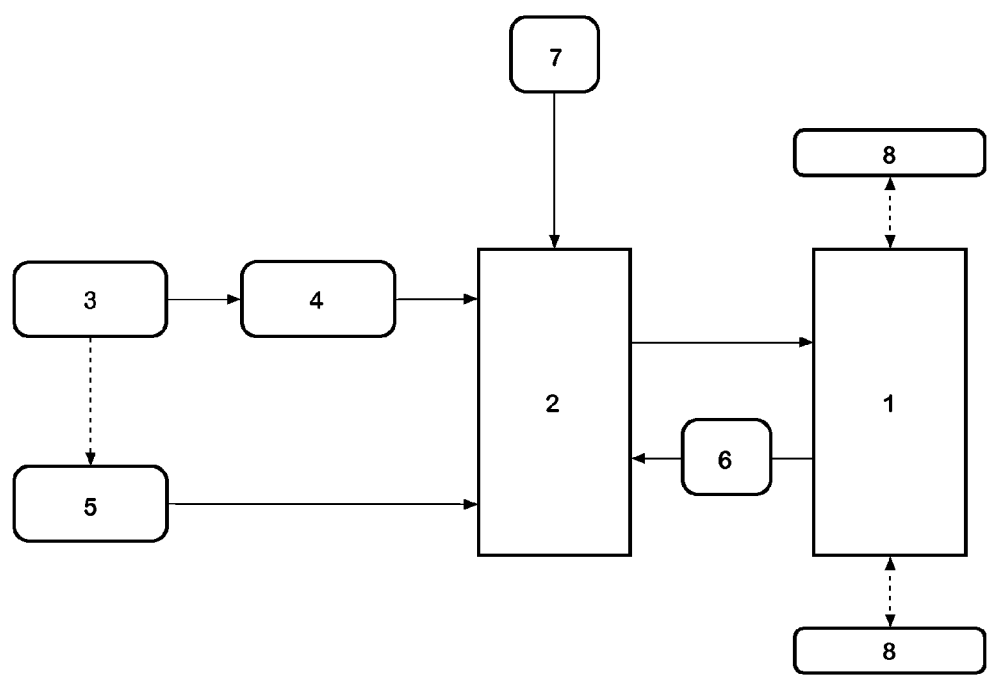
FIG. 1 is a schematic representation of the flow of power distribution which takes place in he Stirling-Electric Hybrid Automobile of the invention.

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof which are within the scope of the appended claims.

FIG. 1 is a schematic representation of the distribution of power which takes place in the Stirling-Hybrid Automobile of the invention herein disclosed and claimed. Referring to FIG. 1, automobile 1 is used to produce the motive force which turns drive wheel(s) 8 of the automobile. Automobile 1 should be of sufficient power to provide the automobile with desired speed and acceleration. A transmission means, known to those skilled in the art, may be used to optimize the relative speed of drive wheels 8 and automobile 1 according to acceleration, deceleration and speed requirements at various points of time. The automobile 1, may be of three-phase alternating current design in order to maximize torque with a favorable horsepower to weight ratio. However this does not exclude the implementation of other types of alternating current or direct current motors. A trans-axle automobile(s) or in-hub motor(s) design may eliminate the need for a conventional differential and drive shaft. Additionally a lightweight and smaller power control regulator(s) which may include the use of insulated gate bipolar transistor may replace the need for a traditional transmission as is employed in current production line internal combustion engine automobiles. The employment of the insulated gate bipolar transistor(s) enables the power regulator to rapidly switch the flow of power to and from the various components of the drive system of the automobile of the present invention. The solid-state nature of insulated gate bipolar transistor(s) minimizes the weight of the power regulator and reduces the loss of power through the heat of electrical resistance.

An electric storage device 2 is provided to store electric power and deliver same to automobile 1 as may be required. Electric storage device 2 may include a Lithium Ion electric storage battery in effort to optimize electrical power to weight of the electric storage device. Power control computer is used to monitor operator commands and automobile conditions and cause the required amount of electrical power to from electric storage device 2 to automobile 1, where it is converted to mechanical energy and delivered to drive wheels 8 of the automobile. The electrical storage device 2 is maintained sufficiently charged by a number of sources of electrical energy, including: electric generator 4 (which is driven by external combustion Stirling engine 3); Seebeck thermoelectric generator 5 (utilizing array of thermocouples thermally coupled to the hot exhaust gases of Stirling engine 3 and regenerative braking system 6. While regulation of power delivered to or received from the automobile 1 is a complex function controlled by computer means, one may generally conceptualize the hybrid automobile of the present invention as being driven by automobile 1 principally operated electrical energy from electric storage device 2—with electric storage device 2 being recharged by: electric generator 4 driven by external combustion of Stirling design 3; Seebeck thermoelectric generator 5 coupled to the exhaust of the Stirling engine 3 (and/or to hot parts of Stirling engine 3); and, regenerative braking system 6.

In preference the automobile operator's commands are interpreted by a power control computer which answers through the power control regulator such as an insulated gate bipolar transistor and/or other regulator(s). This regulator routes electric power to and from the drive train of the automobile as interpreted by a desired power control algorithm. The four power sources are integrated and power is distributed depending upon the power demands of the drive train. The power control computer controls the insulated gate bipolar transistor and/or power regulator(s) and distributes the power to and from the drive train as needed by the driver. When the demand for power to drive wheels 8 exceeds the power produced by the electric generator 4 and thermoelectric generator 5 the extra power flows from electric storage device 2 to automobile 1. When the demand for power to drive wheels 8 is less than that produced by generator 5 and thermoelectric generator 5 the excess power therefrom is used to charge device 2. This method of energy recovery and redistribution enables Stirling engine 3 to be idled or shut down once electrical power stored in electric storage device 2 exceeds a predetermined ratio of electrical power consumption compared to electrical power stored. Once the stored power falls below a value determined by power control algorithm utilized the Stirling engine generator may be restarted (thereby causing electric generator 4 and thermoelectric generator 5 to maintain electric storage device 2 sufficiently charged or recharge same.) Depending on state of charge of electric storage device 2 at the beginning of same a the Stirling engine 3 may not be run during voyages of short distance or duration. In the invention herein disclosed and claimed a thermoelectric generator 5, which includes an array of Seebeck thermocouples, is used to enhance utilization of energy resulting from combustion of fuel by Stirling engine 3. Hot exhaust gases from combustion of fuel by Stirling engine 3 are routed through exhaust piping. One side of thermoelectric generator 5 is thermally coupled to said exhaust piping and the other side to means for removal of waste heat. By virtue of the Seebeck effect the resulting temperature causes the thermocouples of the thermoelectric generator 5, without moving parts, to generate electrical power which is then utilized to charge electric storage device 2. The preferred type of thermocouple is a Bismuth/Telluride composition which as been doped with Silicon and Arsenic to provide for a better than 30% efficiency (such as model HZ-14 thermocouples manufactured by the Hi-Z company) of converting heat to electricity.

In preference the exhaust piping will be of a cross-sectional shape which is designed to enhance area for transfer of heat while mitigating against physical damage (from road debris) to the thermocouples or means (such as fins) utilized to remove heat from one side of the thermocouples. In preferred embodiment this is a trapezoidal shape such that the broadest surface is on the top side of the exhaust piping. The shape of the preferred trapezoid has two 120 degree angles on the bottom surface and two 60 degree angles on the top surface. The 120 degree angle has been shown to have an efficient thermal reflective quality with will assist in the internal heat exchange to the top surface of the exhaust pipe system.

In the preferred embodiment the interior of the exhaust piping will be affixed with thermally conductive metal spines and/or baffles to absorb heat from the exhaust gas. The metal spines and/or baffles are affixed to the upper interior surface of the exhaust piping to enhance conduction of heat to said upper surface. In said preferred embodiment one side of the thermocouples ("hot side") will be thermally coupled to the exterior of said upper surface and the other side of the thermocouples ("cool side") thermally coupled to cooling fins, splines which are in turned cooled by flow of air or optionally by liquid coolant. At temperature differential of at least 365 degrees Fahrenheit is desired to obtain optimum conversion of waste heat, from Stirling engine 3, by Seebeck thermoelectric generator 5.

In preferred embodiment of the invention forward (closest to the Stirling engine 3) third of the exhaust piping may be affixed with high temperature thermocouples. The high temperature thermocouples are constructed with high temperature solder to prevent malfunction of the electrical connections. The trailing two thirds may be affixed with lower temperature thermocouples. This arrangement will maximize the conversion of heat to electricity along the exhaust system and mitigate against electrical failure.

Other areas which are heated by operation of Stirling engine 5 (such as the engine block or radiator) may be similarly equipped with Seebeck thermoelectric generators in order to utilize heat resulting from combusting liquid fuels in Stirling engine 3 for useful purposes, namely to generate electrical energy, to charge device 2 and is eventually converted, by engine 1, to motive power to drive wheels 8 of the automobile of the present invention.

In addition to the means for efficient use of liquid fuels above the automobile of the present invention is also equipped with kinetic energy recovery system (represented by 6 of FIG. 1). During deceleration of the automobile of the present invention automobile 1, by means know to those skilled in the art is reconfigured to operate as an electric generator and in resistance to free wheeling or upon braking of the automobile is used to generate electricity which is used to charge device 2 of the automobile. The amount of electrical energy generated by automobile 1, either as a resistance to free wheeling of the automobile or upon actual braking of the automobile is determined by algorithm programmed into the power control computer of the automobile. Because the kinetic energy recovery system cannot brake the automobile to complete stop and for safety purposes the automobile of the present invention is preferably equipped with supplemental braking system of conventional (hydraulic brakes are preferred) design, known to those skilled in the art.

The flow of power from electric storage device 2 to automobile 1, from electric generator 4 to electric storage device 2, from thermoelectric generator 5 to electric storage device 2 and from kinetic energy recovery system 6 is controlled by a power control computer which responds to automobile operator commands. Said power control computer is programmed with a power control algorithm which translates the commands of the automobile driver as well as monitors the power consumption verses power production and responds to power demands of the various components. The power control algorithm determines the power needs as a function of predetermined thresholds of power generation verses power demand and distributes power to automobile 1 or electric storage device 2 as described above. Power distribution is allotted by the power regulator in response to the commands from the driver which are translated by the power control computer as determined by the power control algorithm to control the automobile under normal driving conditions. The power control algorithm will have predetermined threshold limits which will trigger distribution of power to the various components of the power system. This distribution includes but is not limited to events such as when power demand from the automobile 1 and other automobile accessories exceeds power production from electric generator 4 and thermoelectric generators (such as during rapid accelerator or high speed of the automobile). Conversely when power production exceeds power demand then electrical power is routed to the electric storage device 2, charging same.

Once near maximum electric storage device 2 charging has taken place Stirling engine 3 will shut down. Upon Stirling engine 3 shutting down production of electrical power from electric generator 4 will immediately stop, but production of electrical energy from thermoelectric generator 5 will continue until temperature of the exhaust piping is decreased below the temperature threshold for the particular type of thermocouple being used in thermoelectric generator 5.

In preferred embodiment of the invention once Stirling engine 3 is stopped because electric storage device 2 has reached near maximum charge, said Stirling engine 2 will not be restarted until charge of the electric storage device has dropped to approximately 50% of maximum capacity. Conversely, in preferred embodiment, once Stirling engine 3 is started it will not be stopped until electric storage device 2 is charged to near (but not completely at) maximum capacity (in order to leave some ability to charge electric storage device 2 from kinetic energy recovery system and from thermoelectric generator 5 resulting from residual heat in the Stirling engine exhaust piping).

In addition the automobile of the present invention may be equipped with means to charge electric storage device 2 from external means as may be available. This is represented by 7 of FIG. 1. In its simplest form this may be means to plug the automobile of the present invention into household electrical power when not in use. Although the infrastructure does not currently exist to support such possibility the electric storage device 2 of the invention might be charged while moving by electrically charged rails, wire or magnetic sources at some time in the future.

Use of a Stirling engine in automobiles has presented some issues which are different that use of conventional, internal combustion engines. Namely, the Stirling engine being an external combustion engine, it takes some length of time for the engine (and gas therein), usually in the order of a few minutes, for the engine to reach an operating temperature and responds sluggishly to varying power demands. Both of these issues are avoided in the invention herein disclosed primarily by utilization of an electrical storage device 2, such as battery or capacitors, which drives an automobile which in turn provides motive power for the automobile. Namely, the hybrid automobile of the invention herein disclosed is operative from electric storage device 2 while the Stirling engine 3 warms to operating temperature and to provide power for rapid acceleration when desired. An additional benefit of the electric storage device 2 is the automobile of the present invention can be operated entirely on stored electrical power, from electric storage device 2, if the distance to be driven is not too far, one should run out of fuel for the Stirling engine 3, or malfunction requires the Stirling engine 3 be shut down. Secondarily, when rapid decrease of power is required means may be provided to by-pass some or all of the combustion gases directly to exhaust. By using such by-pass efficiency of the Stirling engine 3 is decreased, but at least some of the decrease is compensated for by increased exhaust gas temperatures which increases electrical output of the Seebeck thermoelectric generators 5 thermally coupled to the exhaust of the Stirling engine 3.

Another issue with use of a Stirling engine is they may not be self-starting (namely initial rotary force may be necessary to get them rotating). In the hybrid automobile this issue is preferably addressed by using the electric generator 4 as an automobile to start rotation of the Stirling engine, but use of separate starter motor is not excluded.

The Stirling engine 3 of the automobile of the disclosed invention may be composed of one or more of several non-corrosive gases which remain in gaseous phase at temperatures which the Stirling engine 3 is to be operated. Hydrogen, while not excluded, is not preferred because of the difficulty containing it and the fire/explosion hazard it can create. While not excluded fluorocarbons are also not preferred because of the potential environmental harm they may cause. Helium, or a mix of helium and other relatively inert, low molecular weight, abundant, and inexpensive gases, is preferred for use in the Stirling engine 3 of the invention herein disclosed.

Some limitations associated with use of Stirling engine in an automobile having been mentioned, the advantages should also be mentioned. The Stirling engine has been demonstrated to be a more energy efficient and less polluting engine than conventional internal combustion engine. It limitations for use in automobiles have always been related to delays in reaching operating temperature and sluggish response to varying power demands. The invention solves these by using a Stirling engine to drive a generator to charge a electric storage device, such as electric storage battery and/or capacitors, which provide electrical power to electric motor 1, which provides motive force to drive wheel or drive wheels 8 of the automobile of the invention. At times of high electrical load the electric storage device 2 acts as a buffer of electrical energy, ensuring a continuous supply of electrical power, even when electrical consumption, by electric motor 1 or various accessories of the automobile, exceeds electrical power generated by electric generator 4 and thermoelectric generator. Furthermore the invention provides an improved way for charging the electric storage device 2 of the automobile, namely use of Seebeck thermoelectric generators 5 to recover heat (and convert it to electricity used to charge the electric storage device 2) from the exhaust of the Stirling engine 3 and optionally by use of Seebeck thermoelectric generators on other surfaces heated during and by operation of the Stirling engine.

In addition thereto the automobile of the invention disclosed and claimed is capable of using a wide variety of fuels at with vastly increased fuel efficiency with less atmospheric pollution as compared to that of conventional internal combustion engine design. As an external combustion engine which consumes liquid or gaseous fuel at near atmospheric pressure, nearly any liquid or gaseous fuel which burns cleanly at atmospheric pressure can be used in a Stirling engine. Not only does burning fuel at atmospheric pressure make a greater range of fuels (including those from renewable resources available) but results in approximately 90% less nitrous-oxide emissions than internal combustion of similar power. In addition thereto the Stirling engine, alone (even without the enhanced energy utilization, recovery and reuse means disclosed and claimed herein) is capable of using fuel approximately twice as efficiently as conventional internal combustion engines (not only resulting in improved fuel economy but reducing carbon-dioxide emissions approximately 50% per mile as compared to conventional internal combustion engine design).

Accordingly the invention herein disclosed and claimed permits use of smaller, more efficient, Stirling engines and batteries, without previously unknown fuel efficiency, substantial reduction of pollutants all while providing satisfactory acceleration, deceleration and speed performance.

It will be appreciated by those skilled in the art that the automobile of the invention herein disclosed may be operated in one of several modes. For instance, it may be operated solely as an electric automobile. Namely it may be operated only by electric power stored by electrical storage device 2, and said electrical storage device 2 recharged by external electrical power 7 if desired. In the event of malfunction of thermoelectric generator (or as may be desired) the automobile of the invention could be operated by electrical power stored by electric storage device 2 alone, or in combination with electric generator 4 being driven by Stirling engine 3 (while optimal efficiency produced by synergistic effect associated by cooling exhaust of the Stirling engine by array of thermocouples) efficiency of the automobile would still likely exceed efficiency of currently used internal combustion engines. In the event malfunction (or as may otherwise be desired) of the Stirling engine 3 or electric generator 4 that it drives the hybrid automobile of the invention may be operated by battery and/or capacitors of electric storage device 2 alone or in combination with use of thermocouple array 5. In such mode combustion in the (external) combustion chamber of Stirling engine 3 would be by-passed directly to exhaust, where higher gas temperature would cause the thermocouple array 5 to generate more electrical energy than normal (but, again, without synergistic effect on Stirling engine). In the event of battery malfunction (or at may otherwise be desired) the hybrid automobile could optionally be configured to operate from Stirling engine 3 driven generator 4 with thermoelectric generator 5 cooled exhaust. When operated in such mode power response would be less than optimal, but the automobile might still be operated.

The invention herein disclosed thus represents a new and non-obvious hybrid automobile with ability to use a wide variety of fuel with greater fuel efficiency and less pollution that currently used internal combustion engines. Use of thermocouples to cool exhaust gases of a Stirling engine produces a uniquely synergistic effect, namely both making use of the heat of said exhaust gases to generate electrical energy and to increase temperature differential between high and low gas temperatures of the Stirling engine increasing the efficiency of the Stirling engine itself.

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

What is claimed is:

1. A hybrid-electric automobile having a drive system which is comprised of:
   a. a least one drive wheel;
   b. an electric drive motor mechanically engaged with said at least one drive wheel;
   c. an electric storage device electrically connected to said automobile through a means for controlling the amount of electrical power flowing from said electric storage device to said electric drive motor;
   d. an electric generator electrically connected to said electric storage batter through means for controlling the amount of electrical power flowing from said electric generator to said electric storage device;
   e. external combustion, Stirling engine mechanically connected to said electric generator;
   f. exhaust gas piping running from the exhaust of said external combustion, Stirling engine;
   g. thermoelectric generator comprising array of Seebeck thermocouples thermally coupled to said exhaust gas piping, the electrical output of which is electrically connected to said electric storage device through means for regulating the flow of electrical power flowing from said thermoelectric generator to said electric storage device; and,
   h. kinetic energy recovery system which comprises configuring said electric motor as an electric generator, the electrical output of which is electrically connected to said electric storage device through means for regulating the flow of electrical power flowing from said kinetic energy recovery system to said electric storage device.

* * * * *